United States Patent
Rutkowski

(10) Patent No.: US 9,252,948 B2
(45) Date of Patent: Feb. 2, 2016

(54) BROADCAST ENCRYPTION BASED MEDIA KEY BLOCK SECURITY CLASS-BASED SIGNING

(75) Inventor: Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 12/950,133

(22) Filed: Nov. 19, 2010

(65) Prior Publication Data

US 2012/0128152 A1 May 24, 2012

(51) Int. Cl.
- *G06F 7/04* (2006.01)
- *G06F 17/30* (2006.01)
- *H04N 7/16* (2011.01)
- *H04L 9/08* (2006.01)
- *H04L 9/32* (2006.01)

(52) U.S. Cl.
CPC ............ *H04L 9/0836* (2013.01); *H04L 9/3234* (2013.01); *H04L 2209/601* (2013.01)

(58) Field of Classification Search
CPC ............ H04L 2209/601; H04L 9/0836; H04L 63/064; H04L 2209/606
See application file for complete search history.

(56) References Cited

U.S. PATENT DOCUMENTS

| | | | | |
|---|---|---|---|---|
| 7,155,591 | B2 * | 12/2006 | Ripley et al. | 711/164 |
| 2002/0094088 | A1 * | 7/2002 | Okaue | 380/278 |
| 2005/0108560 | A1 | 5/2005 | Han et al. | |
| 2008/0069353 | A1 | 3/2008 | Lotspiech | |
| 2009/0016533 | A1 | 1/2009 | Jung et al. | |
| 2009/0052672 | A1 | 2/2009 | Bauchot et al. | |
| 2009/0092249 | A1 | 4/2009 | Doherty et al. | |
| 2009/0214029 | A1 | 8/2009 | Jin et al. | |
| 2010/0020968 | A1 | 1/2010 | Jin et al. | |
| 2010/0040231 | A1 | 2/2010 | Jin et al. | |

OTHER PUBLICATIONS

Jin, H., Lotspiech, J., 2009: title "Broadcast Encryption for Differently Privileged" vol. 297, pp. 283-293 in book "Emerging Challenges for Security, Privacy and Trust", subtitle 24th IFIP TC 11 International Information Security Conference, SEC 2009, Pafos, Cyprus, May 18-20, 2009. Proceedings.*

* cited by examiner

*Primary Examiner* — Andrew Nalven
*Assistant Examiner* — Quy Pham
(74) *Attorney, Agent, or Firm* — John R. Pivnichny; Gregory K. Goshorn; Greg Goshorn, P.C.

(57) ABSTRACT

Provided are techniques for verifying, by a first device, that a management key block of a second device is valid. A management key block that includes a plurality of verification data, each of the plurality associated with a plurality of security classes ranked from a high to low, is generated. The first device, which is associated with a security class that is higher than a security class associated with the second device, verifies a management key block of the second device by calculating a management key precursor associated with the higher security class and verifying verification data associated with the higher security class. In this manner, the second device is unable to pass an unauthorized, or "spoofed," management key block.

28 Claims, 6 Drawing Sheets

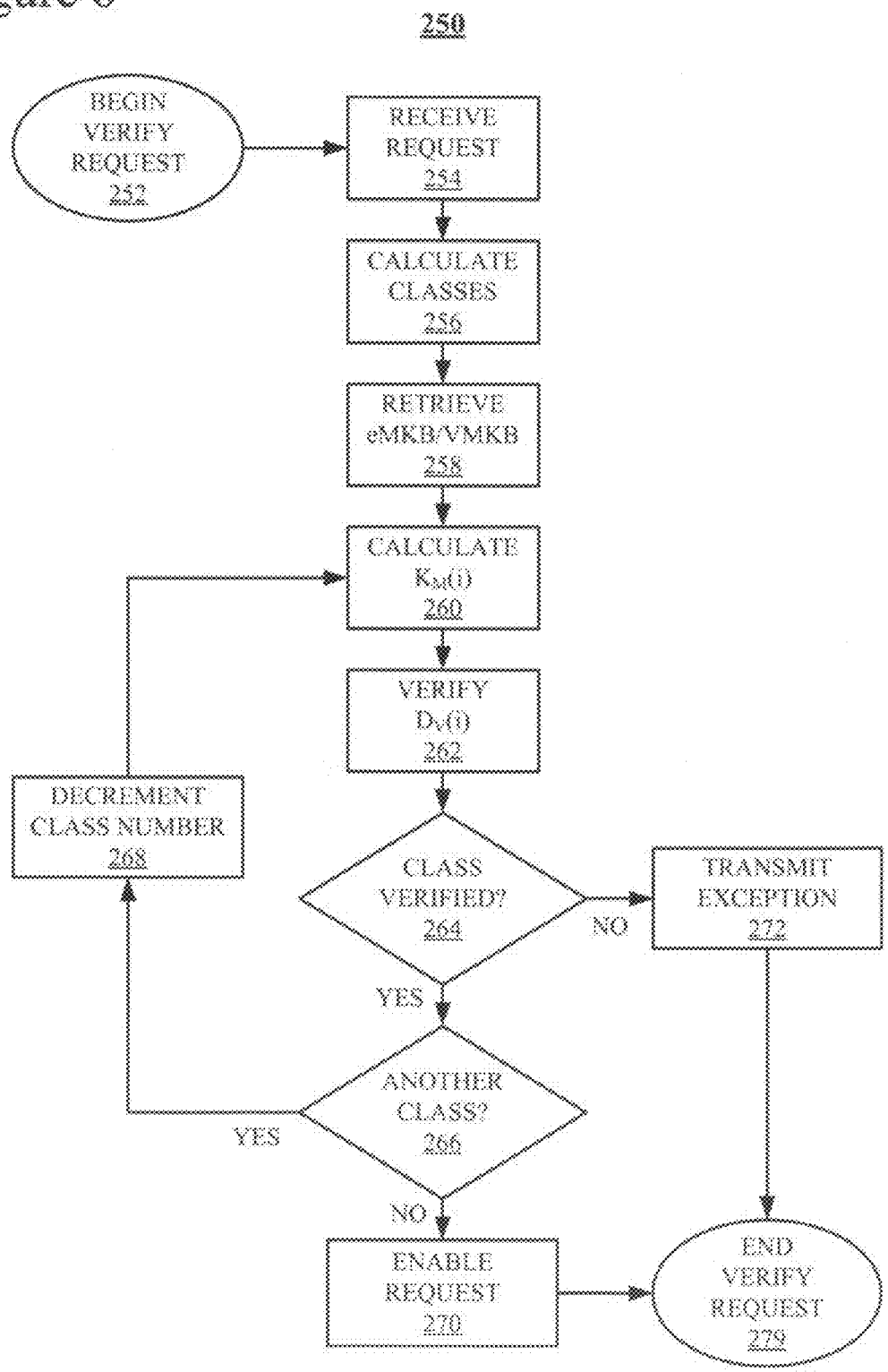

BROADCAST ENCRYPTION BASED MEDIA KEY BLOCK SECURITY CLASS-BASED SIGNING

FIELD OF DISCLOSURE

The claimed subject matter relates generally to computer security and, more specifically, to techniques for the verification of management key blocks according to security classes of a devices.

SUMMARY

As computers and media devices have become connected via networks and the Internet, the amount of content transmitted among these devices has grown in proportion to the size of the communication channels, or the bandwidth. Once used primarily for electronic mail, or email, and small file transfers, networks such as networks in general and the Internet specifically are increasingly relied upon by providers to distribute high quality content such as movies and music recordings.

Content and service providers that distribute such high quality content face correspondingly increased production and/or licensing costs. Industries that seek to extend improved networked services to customers must assure that the collection and management of data remains in compliance with security policies and privacy requirements. To control security and restrict access to such material, content is sometimes protected by encryption, digital rights management (DRM) systems or conditional access (CA) systems.

A recent development in the field of encryption of digital data and communication is broadcast encryption. Broadcast encryption is based upon a Management Key Block (MKB), which is a block of cryptographic key data that can be used in conjunction with a set of Device Keys ($K_D$) on a receiving device (e.g. player, renderer etc.) to derive one or more Management Keys ($K_M$). These Management Keys can be used to (directly or indirectly) decrypt one or more content keys, which in turn can be used to decrypt content. Although for the purposes of the following examples, only a single title key is used, the claimed technology is also applicable to systems that employ multiple title keys. For example, some MKB configurations employ title key blocks in which different devices are potentially assigned to different security classes and derive a particular title key that corresponds to the assigned security class.

The term Content Key can be used to mean a simple Title Key ($K_T$), sets of Title Keys (for the same piece of content), Volume Keys, Sector Keys or Disk Keys and can be generalized to any granularity of key used to protect data. Large blocks of content may be divided into volumes, sectors or disks, each of which with a separate title key. For example, high definition video content may be divided into sectors that correspond to a progression of title keys that change either on a sector-by-sector basis or periodically during the course of a linear broadcast of the content. The MKB can be delivered concurrent with the content, for example at the beginning of a linear broadcast, or obtained "out-of-band" from a broadcast or internet service, messaged from other devices that are part of the same key space or placed on physical media in the case of prerecorded and recordable content. One of the largest advantages to broadcast encryption is that two or more devices, which might be previously unknown to each other, can agree upon a key over a one-way communication path. This advantage makes broadcast encryption ideal for the communication between two security system components.

Another advantage is that broadcast encryption requires two or three orders of magnitude less overhead in the corresponding device than most other systems, thus lowering the cost of the devices for manufacturers and consumers.

Devices that implement the broadcast encryption mechanisms are said to "bind" the data and content they protect to a particular entity (e.g. storage media, a user, an account, a home network or cluster of one or more devices). The entity to which content is logically bound is represented by a domain unique binding identifier ($ID_B$) that is cryptographically combined with one or more management keys ($K_M$) to produce a different key, called the binding key ($K_B$). It should be noted that a $K_M$ used in conjunction with an $ID_B$ can be used as a basis of secure communication between devices in the same network, cluster or authorization table (AT), which is a list of authorized devices in a particular cluster. An example of how a $K_B$ is derived from a simple $K_M$, which is itself derived from a MKB, is explained below. Some current simple approaches to binding a piece of content to a particular entity, regardless of whether it is a piece of media, a device, or a user, is through one level of indirection in the calculation of is encrypted title key ($E_{KT}$) from the entity's binding key ($K_B$). In these cases, the procedure to encrypt a piece of content is roughly the following:

1. Extract a Management Key ($K_M$) by processing the MKB.
2. Perform a one-way function to a piece of data that uniquely identifies the entity this content is being bound to (or the "$ID_B$"), using Km and resulting in a binding key (i.e. $K_B = G(K_M, ID_B)$). In the case of cluster or network binding, $ID_B$ represents a unique network identifier.
3. Select a title key ($K_T$), which may be either random or predetermined, for this piece of content and encrypt it using $K_B$, resulting in an encrypted title key ($EK_T$) (i.e. $EK_T = E(K_B, K_T)$).
4. The content is encrypted with the $K_T$ and then the encrypted content is stored in conjunction with the $EK_T$.
5. If the MKB supports multiple security classes, repeat steps 1-4 for each Management Key at the desired security class to create a set of title keys. Implementations may choose to use the same set of title keys to protect a logical volume of content or all or portions of a disk of content.

Once the procedure has been implemented, any compliant device that has access to the same MKB, $ID_B$ and $EK_T$ can decrypt a communication or content by reproducing the same $K_B$ and decrypting $K_T$.

In a further development, the broadcast encryption system has been extended to enable groups, domains or "clusters," of devices to be collected into secure authorized logical networks. In a particular cluster, the list of authorized devices is represented in an entity called an authorization table (AT). If a device's authorization state is changed (e.g. a new device is authorized, a device is suspended or deleted from the cluster), the AT is updated to reflect the change. The Authorization Table, in such a scheme, would be a component of the Binding Key; therefore, when it is updated any data encrypted by the Binding Key (e.g. Title Keys) would in turn need to be re-encrypted. As devices change "clusters" or networks (e.g. from sale or purchases) the $ID_B$ may also change, again causing a need for the binding key to be updated and hence all content keys.

An addition development with respect to a broadcast encryption-based content protection scheme is, rather than a single $K_M$, multiple management keys, or management key variants ($K_{MV}$), e.g. a $K_{MV}1$, a $K_{MV}2$, and so on, are provided.

Typically, a single device can only calculate a single $K_{MV}$. Management key variants are employed for forensic purposes in situations in which prepared content has been authored with different equivalent variations. Unlike the typical broadcast encryption-based content protection scheme in which device keys are used to directly derive a $K_M$, a device employs the device keys to derive a $K_{MV}$, which is then employed to derive a "base" $K_M$.

Another development is the introduction of management key precursors. Devices are assigned a security class and derive a management key precursor ($K_M(-i)$ or $K_M^{-i}$) from a $K_{MV}$. Devices of higher security classes are assigned higher "i" values. For example, a device with a security class of '3' would be of a higher security class than a device with a class of '1'. A "base," or the lowest, security class is a class of '0'. A device in a security class higher than the base class may calculate a $K_M(-i)$ for devices in a lesser security class, if necessary, all the way to the base class by iteratively executing the following one-way function: $K_M^{-(i-1)} = AES\_G(K_M^{-i}, kcd)$, where kcd is a keyspace specific constant.

Provided are techniques for generating a first management key block (MKB) with a first verification data corresponding to a base security class associated with a first plurality of devices and a second verification data corresponding to a second security class associated with a second plurality of devices, wherein the second security class is a higher security class than the first security class. According to one of the described techniques, the first MKB is transmitted to a first device of the first plurality of devices, wherein a second device of the second plurality of devices, by means of a second MKB transmitted from the first device is able to authenticate the second MKB as an unaltered copy of the first MKB based upon verification data in the second MKB.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

FIG. 6 is a flowchart of one example of a Verify Request process that implements aspects of the claimed subject matter.

DETAILED DESCRIPTION

Figure 1:
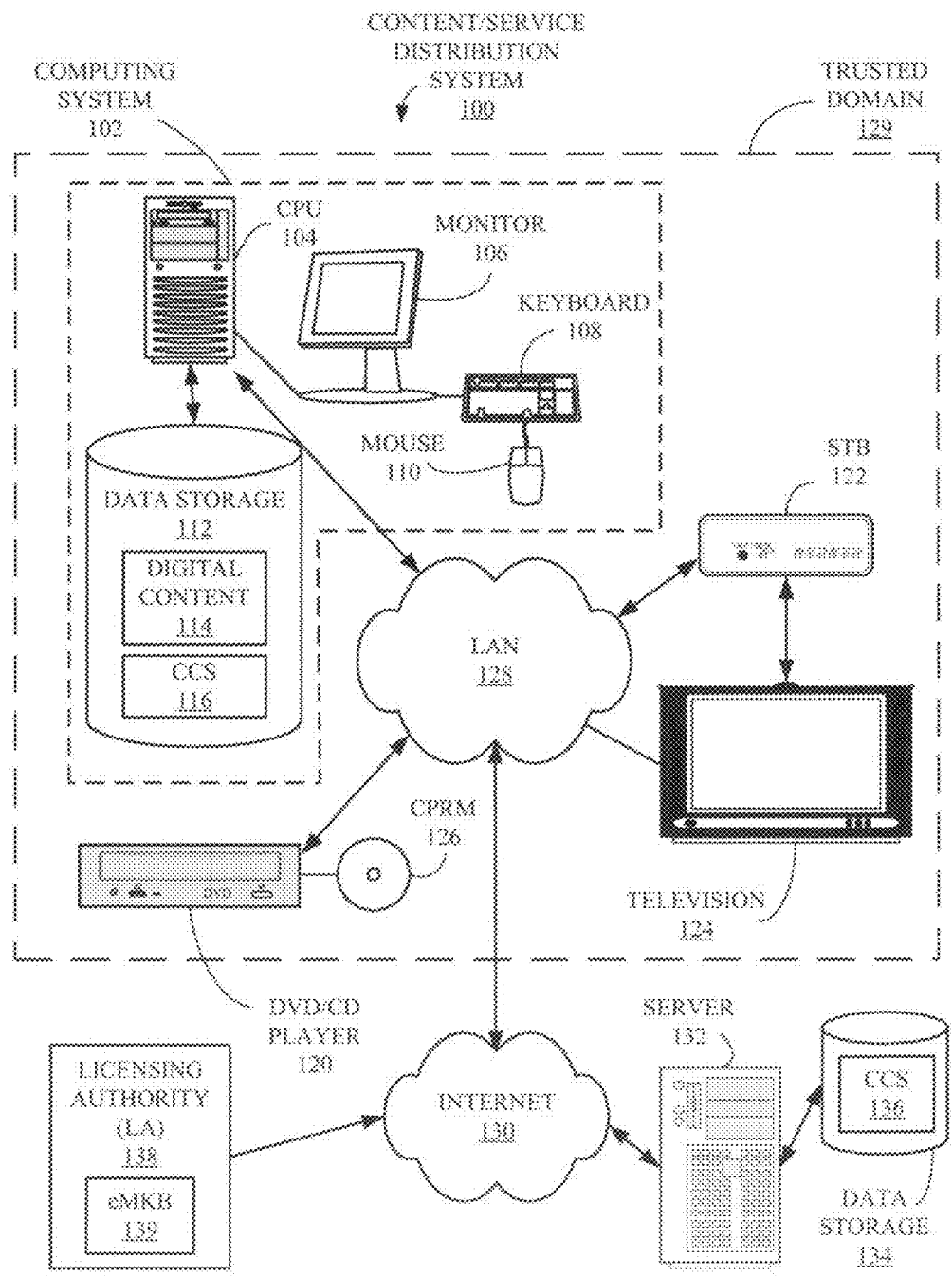
FIG. 1 is a block diagram of one example of a content/service delivery architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for verifying a management key block within a broadcast encryption scheme based upon the class of a device. The term "programmed method", as used herein, is defined to mean one or more process operations that are presently performed; or, alternatively, one or more process operations that are enabled to be performed at a future point in time. The term 'programmed method" anticipates three alternative forms. First, a programmed method may comprise presently performed process operations. Second, a programmed method may comprise a computer-readable medium embodying computer instructions, which when executed by a computer performs one or more process operations. Finally, a programmed method may comprise a computer system that has been programmed by software, hardware, firmware, or any combination thereof, to perform one or more process operations. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the inventors herein have recognized, current broadcast encryption techniques employ a single piece of verification data ($D_V$) to verify a particular management key block (MKB). A $D_V$ is typically generated with the following algorithm: $D_V$=AES_128E ($K_M$, 0123456789ABCDEF$_{16}$||XXXXXXXXXXXXXXXX$_{16}$), in which XXXXXXXXXXXXXXXX$_{16}$ is an arbitrary 8-byte value and $K_M$ is the correct final Management key value. However, since any authorized device can calculate $K_M$, a bad, or "hacked," device could create and distribute a fake MKB by signing the fake MKB with a valid $K_M$.

Turning now to the figures, FIG. 1 is a block diagram of one example of a content/service delivery architecture, or content/service distribution system, 100 that may implement the claimed subject matter. A computing system 102 includes a central processing unit (CPU) 104, which is coupled to a monitor 106, a keyboard 108 and a mouse 110. Monitor 106, keyboard 108 and mouse 110 facilitate human interaction with computing system 102. Attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing an example of content, i.e. digital content 114, which is described in more detail below in conjunction with FIGS. 3-6. It should be noted that although digital content 114 is described as digital data, there is no requirement that content protected by the claimed subject matter be digital in nature. The claimed subject matter is equally applicable to analog content. Digital content 114 is used merely as an example for the purposes of illustration. Stored on data storage is a content control system (CCS) 116 that is one example of logic that may implement aspects of the claimed subject matter. CCS 116 is described in more detail below in conjunction with FIGS. 2-6. It should be noted that CCS 116 is shown installed on client system 102 for the purpose of the following description but could also be installed on any media delivery device, such as, but not limited to, a digital video device/compact disk (DVD/CD) player 120, a set-top box (STB) 122 and television 124. CCS 116 may also be stored by network accessible (or attached) storage devices, i.e. stored in a remote Internet account but accessible by the network. CCS 116 may also be comprised of many different storage devices and locations but made to appear as one logical system via file system software (e.g. network file system or grid file system).

Computing system 102 is part of an authorized, or trusted, domain 129 of devices. In general, an authorized or trusted domain is a group of devices that adhere to the standards of the claimed subject matter and are able to freely share digital content that is authorized for use by any one of them and in which the authorization has not been revoked. Trusted domain 129, in this example, may also include DVD/CD player 120, set-top box (STB) 122, television 124 and flash memory (not shown). Devices 102, 120, 122 and 124 are used merely as examples of types of devices that might be included in an authorized or trusted domain such as domain 129. Those with skill in the relevant arts will appreciate that are many types of devices, such as, but not limited to, a digital video recorders (DVR), personal computer (PC), book reader, portable drives, mobile phones, and so on, that would benefit form the ability to freely share digital content that is otherwise protected from devices outside of a trusted domain.

Devices 102, 120, 122 and 124 of trusted domain 129 are communicatively coupled via a local area network (LAN) 128. Of course, there are many options for coupling such devices including direct connections, wireless connections and even over multiple interconnected LANs (not shown), a metro area network (MAN) or a wide area network (WAN). In addition, there could be devices (not shown) coupled to LAN 128 or any of devices 102, 120, 122 or 124 that are not included in trusted domain 129. A disk 126 implementing, in this example, Content Protection for Recordable Media (CPRM) is rendered and maybe produced by DVD/CD player 120. CPRM is also applicable to streamed media content. It should be noted that CPRM disk 126 is used merely as an example of one of multiple possible content protection schemes. One other example is the Advanced Access Content System (AACS) developed by a consortium including IBM and other companies. In addition to CPRM, other examples of content protection schemes include Secure Digital (SD) cards (not shown) and Content Protection for Extended Media (CPXM). Disk 126 may include information for implementing the claimed subject matter.

LAN 128 is coupled to the Internet 130, which is communicatively coupled to a server 132. In the following description, server 132 is used as an example of a source of downloaded digital content. Although not shown, server 132 typically includes a CPU, or processor, keyboard, mouse and monitor to enable human interaction. Although in this example, computing system 102 and server 132 are communicatively coupled via LAN 128 and the Internet 130, in alternative embodiments they may be coupled through any number of communication mediums such as, but not limited to, a direct wire or wireless connection. Further, server 132 could be linked directly to LAN 128 and could be either included in trusted domain 129 or not. In this example, server 132 is not part of trusted domain 129. Server 132 is coupled to a data storage device 134, which, like data storage 112, may either be incorporated into server 132 i.e. an internal device, or attached externally to server 132 by means of various, commonly available connection devices such as but not limited to, a universal serial bus (USB) port (not shown). Data storage device 134 is illustrated storing a CCS 136, which is described in more detail below in conjunction with FIGS. 2-6.

Also coupled to Internet 130 is a licensing authority (LA) 138, which as explained in detail below, generates enhanced management key blocks (eMKBs), one of which, an eMKB 139, is illustrated. eMKB 139 is associated with content such as digital content 114 and may be delivered to a client in conjunction with associated encrypted content. For example, if digital content 114 was originally delivered on CPMR 126, eMKB 139 would typically also be delivered via CPMR 126. LA 138, CCSs 116 and 136 and eMKBs such as eMKB 139 are employed to implement aspects of the claimed subject matter and are described in more detail below in conjunction with FIG. 2-6.

Figure 2:
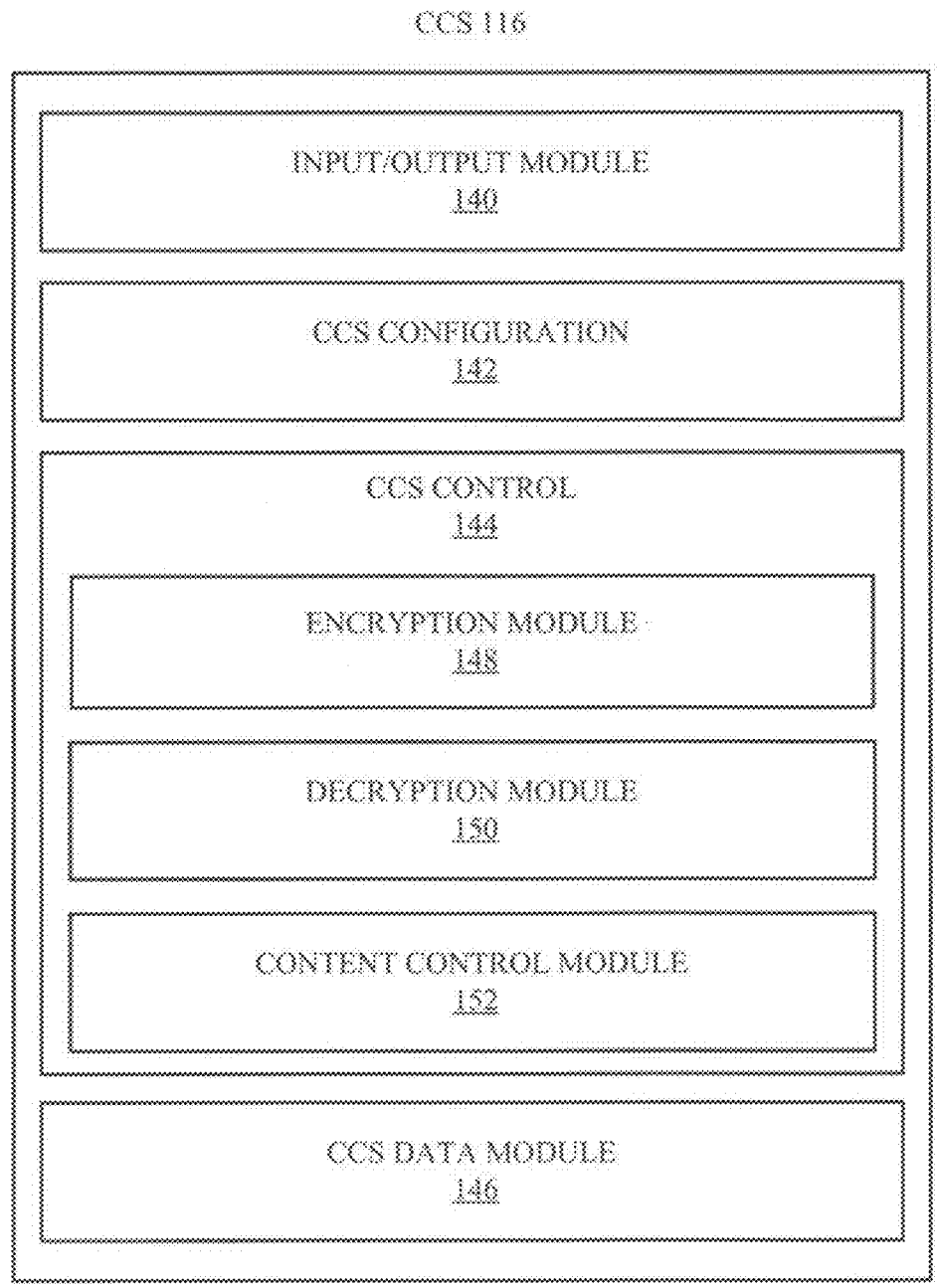
FIG. 2 is a block diagram of a content control system (CCS), first introduced in FIG. 1, in more detail.

FIG. 2 is a block diagram of a CCS such as CCSs 116 and 136, first introduced in conjunction with FIG. 1, in more detail. For the sake of convenience, a CCS is described with respect to CCS 116. In this example, CCS 116 is stored on data storage 112 (FIG. 1) and executed on CPU, or processor, 104 (FIG. 1) of computing system 102 (FIG. 1). A similar device, i.e. CCS 136, is illustrated on server 132 (FIG. 1). Of course, CCS 116 could also be stored and executed on another computing system (not shown) or any media, service or content delivery device such as, but not limited to, DVD/CD player 120 (FIG. 1), STB 122 (FIG. 1) and server 132 (FIG. 1). In fact, the disclosed techniques may be implemented on any device that is configured to control access to content, a service and/or data. CCS 116 includes an input/output (I/O) module 140, a CCS Configuration module 142, a CCS Control module 144 and a CCS data module 146. It should be understood that the representation of CCS 116 in FIG. 2 is a logical model. In other words, components 140, 142, 144, 146 and other components described below may be stored in the same or separate files and loaded and/or executed within system 100 either as a single system or as separate processes interacting via any available inter process communication (IPC) techniques.

I/O module 140 handles communication CCS 116 has with other components of computing system 102 and system 100. CCS configuration module 142 stores parameters defined by an administrator to control the setup and operation of CCS 116. Examples of such configuration parameters include, but are not limited to, security settings, display options and so on. In addition, parameters may be defined that list potential users, applications and computing hosts and corresponding levels of security and specific implementations of the claimed technology.

CCS control module 144 includes logic to control the operation of CCS 116 in conformity with parameters stored in CCS configuration module 142. CCS control module 144 includes an encryption module 148, a decryption module 150 and a content control module (CCM) 152, all of which are explained in more detail below in conjunction with FIGS. 5-6. CCS data module 146 is a data repository or cache for information, including settings and other information that CCS 116 requires during operation. Examples of the types of information stored in CCS data module 146 include, but are not limited to, specific commands employed in conjunction with modules 148 and 150. In addition, CCS data module 146 may store intermediate results associated with the processing of CCS 116. Processing associated with elements 116, 140, 142, 144, 146, 148, 150 and 152 are described in more detail below in conjunction with FIGS. 5-6.

Figure 3:
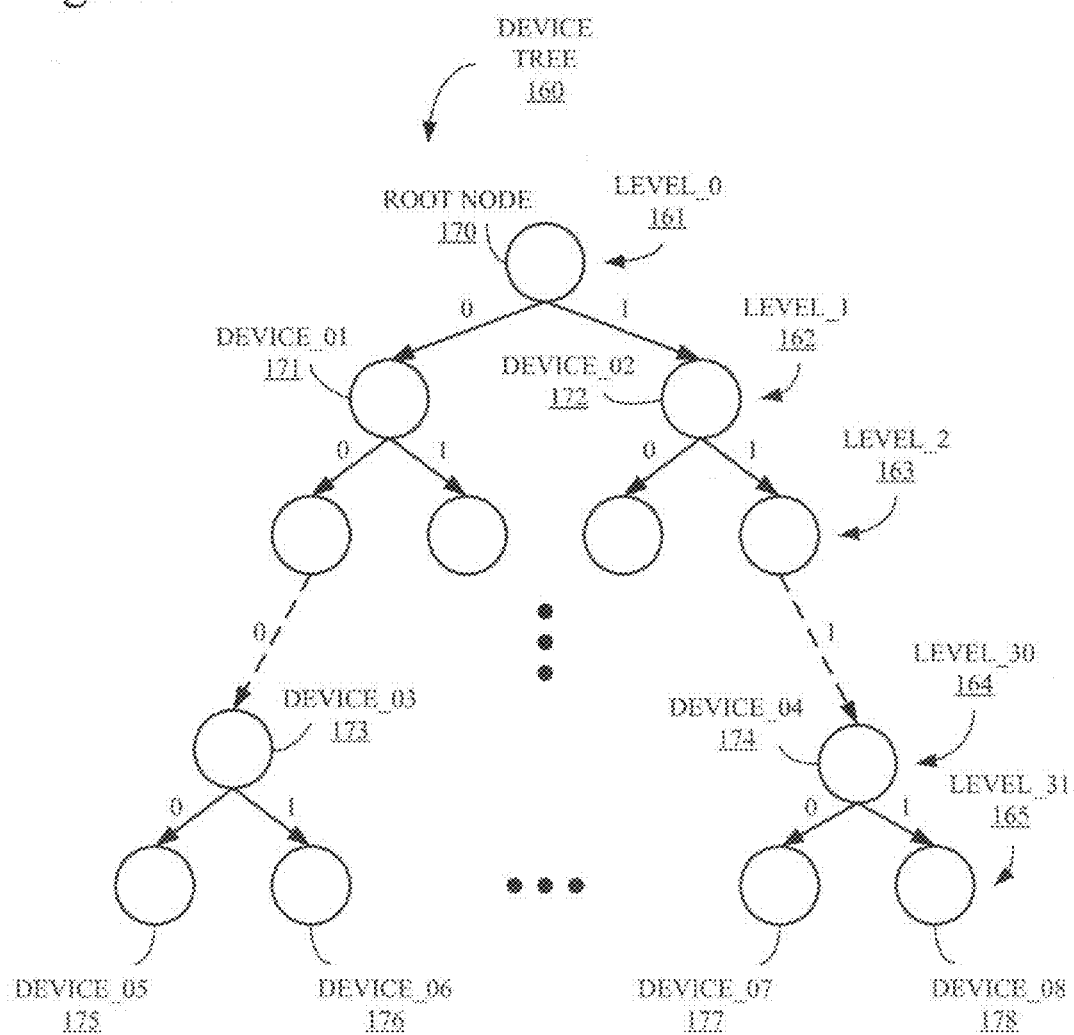
FIG. 3 is a block diagram of a hierarchical device tree employed in one embodiment of the claimed subject matter.

FIG. 3 is a block diagram of a hierarchical binary device tree 160 employed in one embodiment of the claimed subject matter and employed throughout the present description to explain aspects of the claimed subject matter. Device tree 160 is organized into thirty-two (32) levels, i.e. a level_0 161, a level_1 162, a level_2 163 and so on up to a level_30 164 and a level_31 165. For the sake of simplicity, intervening levels are not illustrated. Level_0 161 has one (1) device, or node, i.e. a root node 170, and each level 161-166 has the potential of twice as many devices, or nodes, as the immediately preceding level. For example, level_0 161 represents one (1 or $2^0$) device, level_1 162 has two (2 or $2^1$) nodes, level_2 163 has four (4 or $2^2$) and so on up to level_30 164, which potentially has $2^{30}$ listed devices, and level_31 165, which potentially has $2^{31}$ listed devices. At each level devices, or nodes, are represented as circles but, for the sake of simplicity, each device is not necessarily labeled.

Two examples of devices at level_1 162, i.e. a device_01 171 and a device_02 172, and two examples of devices at level_30 164, i.e. a device_03 173 and a device_04 174, are labeled. Several examples of devices at level_31 165 are labeled, i.e. a device_05 175, a device_06 176, a device_07 177 and a device_08 178. Each device in tree 160, such as devices 171-178, whether labeled or not has a unique device number that represents a pre-order traversal of device tree 160. Each connection between nodes at the adjacent levels is labeled either '0' for a left traversal of tree 160 or '1' for a right traversal. In this manner, device_05 175 has a device number of "0000 0000 0000 0000 0000 0000 0000 0000 0000," device_06 176 has a device number of "0000 0000 0000 0000 0000 0000 0000 0000 0001," device_07 177 has a device number of "1111 1111 1111 1111 1111 1111 1111 1111 1110" and device_08 178 has a device number of "1111 1111 1111 1111 1111 1111 1111 1111 1111." Device tree 160, levels 161-165, root node 170, devices 171-178 and devices numbers are used as examples during the reminder of the present description to explain the claimed subject matter.

Figure 4:
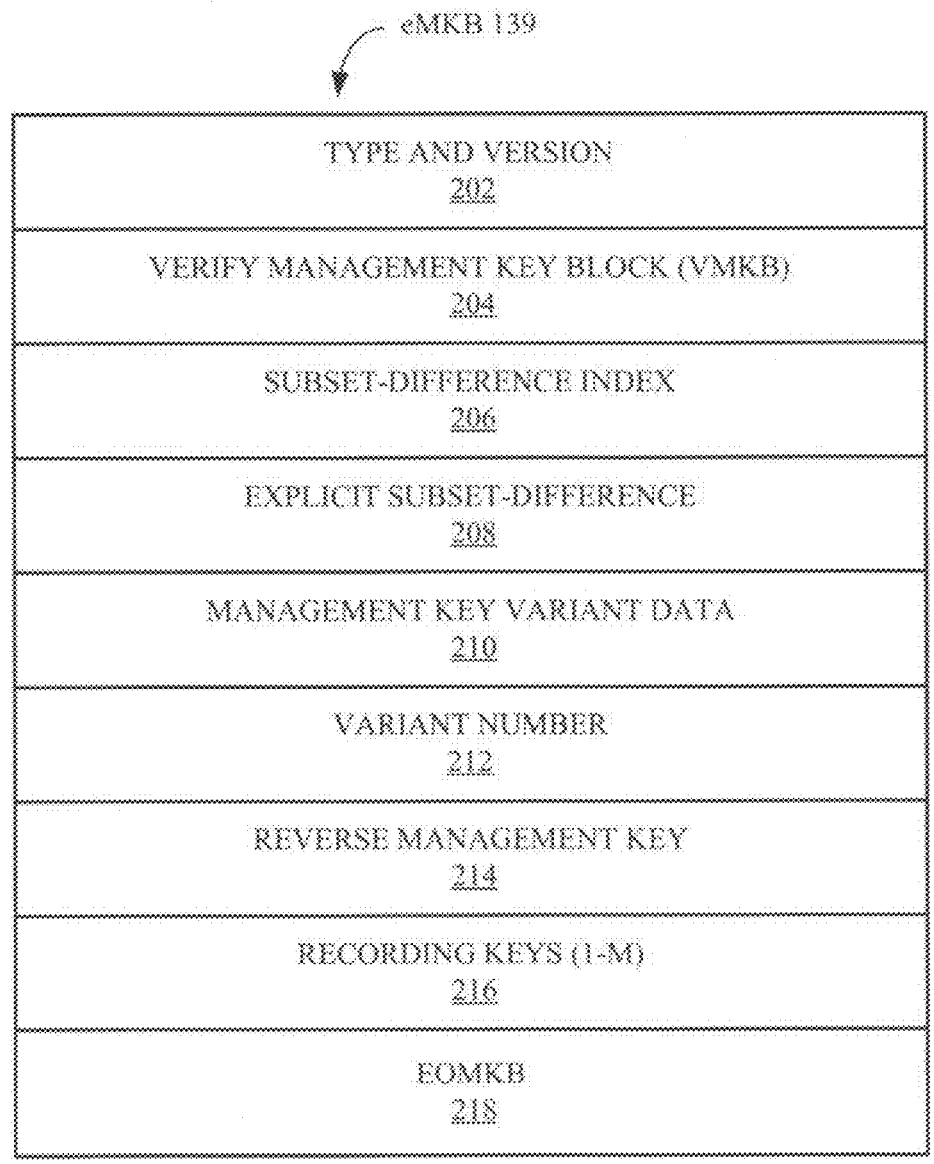
FIG. 4 is a block diagram of an enhanced management key block (eMKB), first introduced in FIG. 1, in more detail.

FIG. 4 is a block diagram of eMKB 139, first introduced in FIG. 1, in more detail. EMKB 139 is an example of a MKB that has been modified to implement the claimed subject matter. As explained above in conjunction with FIG. 1, eMKB 139 is generated by LA 138 (FIG. 1) and may be transmitted in conjunction with encrypted content, such as digital content 114 (FIG. 1) to a device, in this example computing system 102 (FIG. 1). In this example, CCS 116 (FIG. 1) employs eMKB 139 to decrypt digital content 114 for rendering by computing system 102.

EMKB 139 includes a type and version block 202, a verify management key block (VMKB) 204, a subset-difference index 206, an explicit subset-difference block 208, a management key variant data block 210, a variant number block 212, a reverse management key block 214, recording keys (1-M) block 216 and an end of management key block (EOMKB) 218. Type and version block 202 is employed by a content control system of a device, in this example CCS 116 (FIG. 1) of computing system 102 (FIG. 1), to determine the proper manner to process a corresponding MKB, such as eMKB 139, and whether or not a received MKB is more recent than any MKB currently stored on device 102. In this example, a version number, stored in block 202, is a 32-bit unsigned integer. LA 138 (FIG. 1) increments the version number and inserts the updated number into subsequent MKBs each time a change necessitates an update. Examples of such a change include, but are not limited to, an addition to or deletion from authorized or prohibited device lists.

VMKB 204 is employed by CCS 116 to process eMKB 139 and calculate a management key ($K_M$), either directly or indirectly from a management key precursors ($K_M^{-1}$) depending upon the particular implementation. Management keys and management key precursors are described in more detail below in conjunction with FIGS. 5-6. Subset-difference index 206 stores an index that enables a particular device to more efficiently lookup the device's corresponding record in explicit subset-difference block 208. Explicit subset-difference block 208 stores a number of records, each record containing a U mask ($m_u$) (not shown) and a UV number (not shown). A V mask ($m_v$) and a path number are derived from the UV number. Like the $m_u$, the $m_v$ is applied against the path number to identify a node in eMKB 139 and the identified node represents a subset of nodes, i.e. the specific node and all the connected nodes below. Together, the $m_u$ and $m_v$ identify a "subset-difference," i.e. a sub-tree of nodes of device tree 160 (FIG. 3) rooted at the node identified by $m_u$ minus the sub-tree of nodes rooted at the node identified by $m_v$. Blocks 206 and 208 and the subset are explained in more detail below in conjunction with FIGS. 5-6.

Management key variant data 210 stores management key variant data for subset-differences identified in explicit subset-difference record 208. Variant number block 212 stores the associated encrypted variant number data for the subset-differences identified in explicit subset-difference record 208. Reverse management key block 214 stores information to enable CCS 116 to decrypt a $K_M$ from a management key variant stored in block 210. In one embodiment of the claimed subject matter, a reverse management key enables CCS 116 to calculate a management key precursor instead of a management key. A management key is then calculated from the management key precursor. Recording keys (1-M) block 216 stores encrypted recording keys. Management key variants, variant numbers, reverse management keys and recording keys are described in more detail below in conjunction with FIGS. 5-6. Finally, EOMKB 218 indicates the end of eMKB 139.

Figure 5:
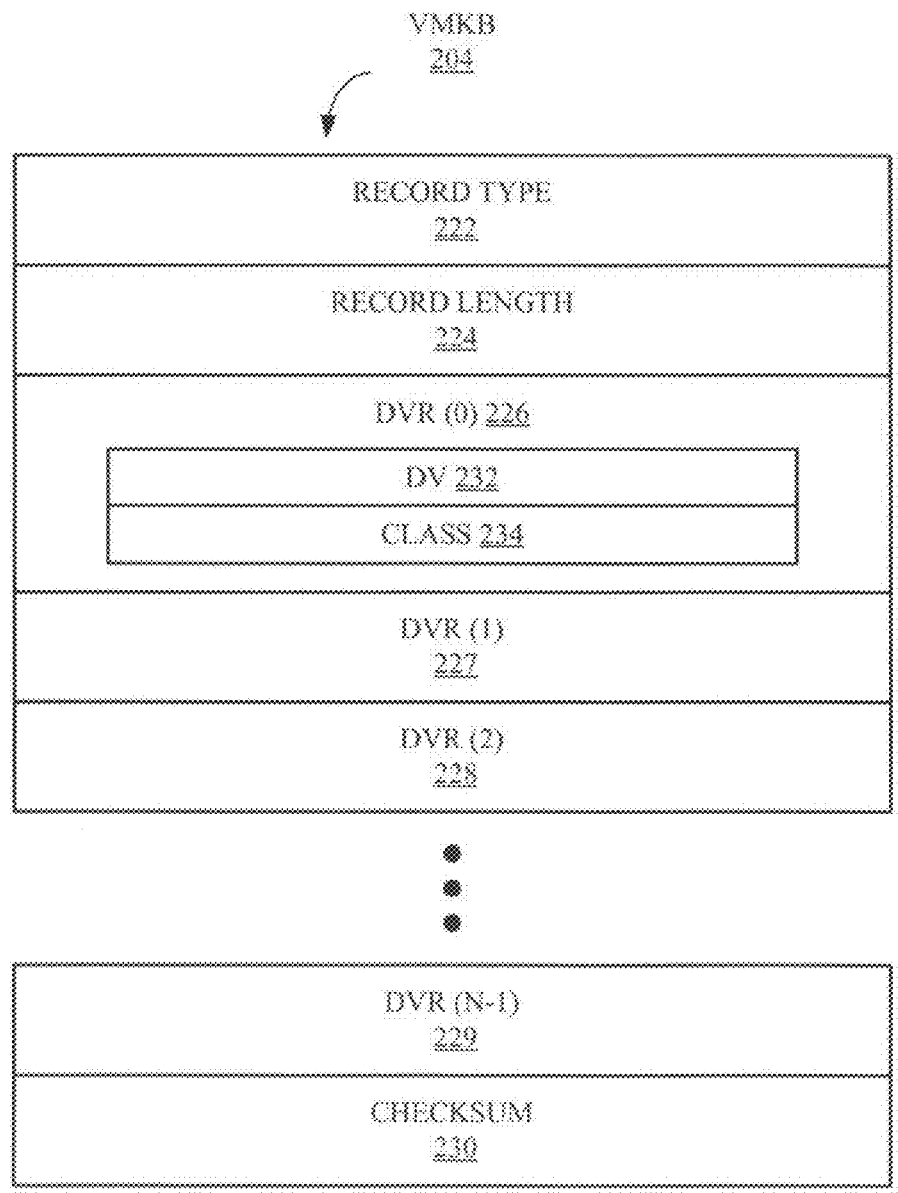
FIG. 5 is a block diagram of a Verify Management Key Block (VMKB), first introduced in FIG. 4, in more detail.

FIG. 5 is a block diagram of VMKB 204, first introduced in FIG. 4, in more detail. Like eMKB 139 (FIGS. 1 and 4) of which VMKB 204 is part, VMKB 204 is generated by LA 138 (FIG. 1) and transmitted in conjunction with encrypted content, such as digital content 114 (FIG. 1) to a device, in this example computing system 102 (FIG. 1). In the following example, CCS 136 (FIG. 1) of server 132 (FIG. 1) employs VMKB 204 to authenticate and authorize requests from a device that is a lower class than server 132, such as computing system 102 (FIG. 1).

VMKB 201 includes a record type block 222, which is employed by a content control system of a device, in this example CGS 136 of server 132, to determine the proper manner to process a corresponding VMKB, such as VMKB 204. Record length 224 stores the overall length of the corresponding VMKB thus enabling variable length VMKB records. VMKB 204 also comprises a number of verification data records (DVR) (0 through N−1) 226, 227, 228 and 229.

For the sake of convenience, only four (4) such records are illustrated and only DVR (0) 226 is shown in any detail. Any particular device includes a DVR corresponding to each of the security classes in which the device is authorized. For example, a device of security class 4 would typically include five (5) DVRs, one for each of security levels 0-4. It should be noted although this example includes five security levels, the claimed subject matter also applicable to any finite number of security levels.

Each of DVR 226-229 comprises verification data ($D_V$) 232 and a corresponding Class block 234. As explained above, a typical ($D_V$) is employed to verify a particular management key block (MKB). A $D_V$ is typically generated for comparison with a stored $D_V$ such as $D_V(0)$ 232 with an algorithm similar to the following: $D_V = AES\_128E (K_M, 0123456789ABCDEF_{16} \| XXXXXXXXXXXXXXXX_{16})$, in which $0123456789ABCDEF_{16}$ is a example of a CCS or domain specific component of the verification record, $XXXXXXXXXXXXXXXX_{16}$ is an 8-byte value that may either be arbitrary or correspond, either directly or indirectly to a checksum value (see 230, FIG. 5) and $K_M$ is a Management key value such as a management key precursor ($K_M^{-i}$) associated with the security class of the $D_V$ to be checked. Class block 234 identifies a security class associated with the corresponding DV 232. Of course, it should be noted that the formula above is merely an example and that the variables maybe different lengths or even variable lengths as needed by a particular cipher or algorithm that employ a different key length than those in the example.

VMKB 204 also includes a checksum 230 for verify that VMKB 204 has not been corrupted or altered. In an alternative embodiment, there may also be some indication of a particular algorithm for checking checksum 230. Checksum 230 may also be an optional field with LA 138 producing a value that affects the $D_V$ functions' $XXXXXXXXXXXXXXXX_{16}$ value as described above. In one alternative embodiment, each of DVRs 226-229 may include a checksum. VMKB 204, DVRs 226-229, DVs such as DV 232 and security classes such as class 234 are explained in more detail below in conjunction with FIG. 6.

FIG. 6 is a flowchart of one example of a Verify Request process 250 that implements aspects of the claimed subject matter. In this example, logic associated with process 250 is stored on data storage 134 (FIG. 1) as part of CCS 136 (FIG. 1) and executes on a processor (not shown) of server 132 (FIG. 1). Process 250 starts in a "Begin Verify Class" block 252 and proceeds immediately to a "Receive Request" block 254.

During block 254, process 250 receives a request from a different device or service, in this example from computing system 102 (FIG. 1), typically in conjunction with a new eMKB as determined by an identifying checksum value of the entire eMKB data and a purported version number included in the eMKB, for a service, in this example associated with server 132. For the purposes of illustration, server 132 corresponds to device_01 171 (FIG. 3) of level_1 162 and computing system 102 corresponds to device_04 174 (FIG. 3) of level_30 164 (FIG. 3). Further, level_1 162 is a higher security class than level_30 164. It should be noted that, although in this example the requested service is associated with server 132, the service may be provided by another computing device with server 132 providing the required authentication and verification of the received request. During a "Calculate Classes" block 256, process 250 determines the classes corresponding to both the device associated with the request received during block 254 and the device from which the requested service is to be fulfilled. By employing the disclosed techniques a device of one class may authenticate and authorize service to a device of a lower class.

During a "Retrieve eMKB/VMKB" block 258, process 250 retrieves an eMKB such as eMKB 139 (FIGS. 1 and 4) associated with the device that is processing the request, e.g. server 132, and the VMKB 204 (FIGS. 4 and 5) contained in the retrieved eMKB 139. During a "Calculate $K_M(i)$" block 260, process 250 calculates a management key precursor, or $K_M(i)$. During the first iteration of process 250, the "i" corresponds to the security class of the device that has received the request during block 254. During a "Verify $D_V(i)$" block 262, process 250 verifies $K_M(i)$ with the corresponding $D_V(i)$. In one example, the following formula is employed to compare a calculated $D_V(i)$ with the appropriate stored $D_V(i)$:

$$D_V(i) = \text{AES-128}E(K_M(i), 012345678ABCDEF_{16}, XXXXXXXXXXXXXXXX_{16}),$$

Where $0123456789ABCDEF_{16}$ is one example of a CCS or domain specific component of the verification record, $XXXXXXXXXXXXXXXX_{16}$ is an 8-byte value, either arbitrary or corresponding to an eMKB checksum value, and $K_M(i)$ is the correct management key.

During a "Class Verified?" block 264, process 250 determines whether or not the stored $D_V(i)$ matches the calculated $D_V(i)$. If so, process 250 proceeds to an "Another Class?" block 266. During block 266, process 250 determines whether or not all the classes between the security class of the device that received the request during block 254 and the device that transmitted the request as determined during block 256 have been processed. If not, process 250 proceeds to a "Decrement Class Number" block 268 during which the value of "i" is decremented, control returns to block 260 and processing continues as described above with respect to the next lower security class.

In short, by executing the one-way function, $K_M^{-(i-1)} = \text{AES\_G}(K_M^{-1}, kcd)$, where kcd is a keyspace specific constant, process 250 verifies $D_V(i)$ in the corresponding classes. In this manner, a device can verify that a MKB of a device in a lower security class has not been "spoofed" by being signed with a valid $K_M$ associated with the lower security class. In addition, it should be noted that the disclosed techniques are applicable to any number of security levels or, in other words, the low and high security classes may be separated by one or more intermediate security classes. It should be noted that throughout the Specification the term "higher" as related to security levels implies that the corresponding devices have equal or more permissions and/or equal or less restrictions than devices associated with "lower" security levels.

If each security class between the class of the transmitting device and the receiving device, inclusive, has been verified, process 250 proceeds to an "Enable Operation" block 270 during which the appropriate service provider is notified that the server may proceed. In addition, a receiving device or service may "adopt," or store, the eMKB for all subsequent operations with the transmitting device or service. If during block 264, process 250 determines that a class has not been authenticated, control proceeds to a "Transmit Exception" block 272 during which appropriate actions are taken with respect to a device that has requested a service to which the device is not authorized.

Finally, once the request has been enabled during block 270 or an exception has been transmitted during block 272, control proceeds to an "End Verify Request" block 279 in which process 250 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:

1. A system, comprising:
    a processor;
    a non-transitory memory coupled to the processor;
    a first management key block (MKB), comprising:
        a first verification data block; comprising:
            a first verification data; and
            a first class block, wherein the first class block identifies a first security class, corresponding to a security class associated with a first plurality of devices, associated with the first verification data; and
        a second verification data block; comprising:
            a second verification data; and
            a second class block, wherein the second class block identifies a second security class, corresponding to a second security class associated with a second plurality of devices, associated with the second verification data, and
                wherein the second security class is a higher security class than the first security class and the first plurality of devices is not a subset of the second plurality of devices; and logic stored on the memory and executed on the processor for authenticating a second MKB transmitted from a first device of the first plurality of devices as unaltered based upon the first and second verification data, wherein the first MKB and the second MKB are not a common MKB.

2. The system of claim 1, the logic for authenticating the second MKB comprising logic for generating first verification data corresponding to the first MKB from second verification data corresponding to the second MKB.

3. The system of claim 1, wherein the second MKB is transmitted from any device associated with the second plurality of devices.

4. The system of claim 1, the first MKB further comprising stores a third verification data corresponding to a third security class associated with a third plurality of devices, wherein the third security class is a higher security class than the first security class and a lower security class than the second security class; and wherein the second MKB is transmitted to the second device from the first device via a third device of the third plurality of devices.

5. The system of claim 1, wherein the logic for authenticating the second MKB, further comprises logic for:
calculating, by the second device, a management key precursor corresponding to the second verification data copy ($K_M(1)$);
generating a third verification data based upon $K_M(1)$; and
verifying the first verification data copy by comparing with third verification data.

6. The system of claim 1, the first MKB further comprising a checksum based upon the first MKB; and the logic for authenticating the second MKB comprising logic for comparing a checksum stored in the second MKB with the checksum stored in the first MKB.

7. A computer programming product, comprising:
a non-transitory memory;
logic stored on the memory for execution on a processor for:
generating a first management key block (MKB), the generating comprising:
generating a first verification data block, the first verification data block comprising:
a first verification data; and
a first class block, wherein the first class block identifies a first security class, corresponding to a security class associated with a first plurality of devices, associated with the first verification data;
generating a second verification data block; the second verification data block comprising:
a second verification data; and
a second class block, wherein the second class block identifies a second security class, corresponding to a second security class associated with a second plurality of devices, associated with the second verification data, and wherein the second security class is a higher security class than the first security class and the first plurality of devices is not a subset of the second plurality of devices; and
storing the first verification data and the second verification data in the first MKB, wherein verification data associated with a second MKB are operable to enable a first device of the second plurality to authenticate a second MKB, transmitted from a second device of the first plurality of devices, as unaltered based upon the first and second verification data, wherein the first MKB and the second MKB are not a common MKB.

8. The computer programming product of claim 7, the logic for authenticating the second MKB comprising logic for generating first verification data corresponding to the first MKB from second verification data corresponding to the second MKB.

9. The computer programming product of claim 7, wherein the second MKB is transmitted from any device associated with the first plurality of devices.

10. The computer programming product of claim 7, wherein the logic for authenticating the second MKB, further comprises logic for:
calculating, by the first device, a management key precursor corresponding to the second verification data copy ($K_M(1)$);
generating a third verification data based upon $K_M(1)$; and
verifying the first verification data copy by comparing with third verification data.

11. A method, comprising:
generating, by a processor, a first management key block (MKB), the generating comprising:
generating a first verification data block, the first verification data block comprising:
a first verification data; and
a first class block, wherein the first class block identifies a first security class, corresponding to a security class associated with a first plurality of devices, associated with the first verification data;
generating a second verification data block; the second verification data block comprising:
a second verification data; and
a second class block, wherein the second class block identifies a second security class, corresponding to a second security class associated with a second plurality of devices, associated with the second verification data, and wherein the second security class is a higher security class than the first security class and the first plurality of devices is not a subset of the second plurality of devices; and
storing the first verification data and the second verification data in the first MKB, wherein verification data associated with a second MKB are operable to enable a first device of the second plurality to authenticate a second MKB, transmitted from a second device of the first plurality of devices, as unaltered based upon the first and second verification data, wherein the first MKB and the second MKB are not a common MKB.

12. The method of claim 11, wherein the first device is able to authenticate the second MKB as unaltered by generating a first verification data corresponding to the first MKB from a second verification data corresponding to the second MKB.

13. The method of claim 11, wherein the second MKB is transmitted from any device associated with the first plurality of devices.

14. The method of claim 11, further comprising:
generating a third verification data corresponding to a third security class associated with a third plurality of devices, wherein the third security class is a higher security class than the first security class and a lower security class than the second security class; and
storing the third verification data in the first MKB,
wherein the second MKB is transmitted to the first device from the second device via a third device of the third plurality of devices.

15. The method of claim 14, wherein the first device is able to authenticate the second MKB as unaltered by iteratively generating a first verification data copy from a third verification data copy, which is generated from a second verification data copy, each of the first, second and third verification data copies stored in the transmitted MKB and corresponding to the first, second and third verification data, respectively.

16. The method of claim 1, wherein the authentication of the second MKB, comprises:
calculating, by the first device, a management key precursor corresponding to the second verification data copy ($K_M(1)$);
generating a third verification data based upon $K_M(1)$; and
verifying the first verification data copy by comparing with third verification data.

17. The method of claim 1, further comprising:
generating a checksum corresponding to the first MKB; and
storing the checksum in the first MKB, wherein the first device is able to verify the authenticity of the second MKB based upon a checksum stored in the second MKB.

18. The method of claim 17, further comprising storing a checksum algorithm indicator in the MKB specifying a particular algorithm for verifying the checksum.

19. A method, comprising:
receiving a first management key block (MKB) at a first device of a first plurality of devices from a second device of a second plurality of devices, the first MKB comprising:
a first verification data block; comprising:
a first verification data; and
a first class block, wherein the first class block identifies a first security class, corresponding to a security class associated with a first plurality of devices, associated with the first verification data; and
a second verification data block; comprising:
a second verification data; and
a second class block, wherein the second class block identifies a second security class, corresponding to a second security class associated with a second plurality of devices, associated with the second verification data, and
wherein the second security class is a higher security class than the first security class and the first plurality of devices is not a subset of the second plurality of devices; and
verifying by the first device that a second MKB is unaltered based upon the first and second verification data, wherein the first MKB and the second MKB are not a common MKB.

20. The method of claim 19, the verifying by the first device comprising generating the first verification data from the second verification data.

21. The method of claim 19, wherein the first MKB is transmitted from any device associated with the first plurality of devices.

22. The method of claim 19, wherein the first MKB stores a third verification data corresponding to a third security class associated with a third plurality of devices, wherein the third security class is a higher security class than the first security class and a lower security class than the second security class; and
wherein the first MKB is transmitted to the first device from the second device via a third device of the third plurality of devices.

23. The method of claim 19, wherein the authentication of the first MKB, comprises:
calculating, by the first device, a management key precursor corresponding to the second verification data copy ($K_M(1)$);
generating a third verification data based upon $K_M(1)$; and
verifying the first verification data copy by comparing with third verification data.

24. The method of claim 19, wherein the first device is able to verify the authenticity of the second MKB based upon checksum stored in the first MKB that corresponds to a checksum corresponding to and stored in the second MKB.

25. The system of claim 1, wherein the logic for authenticating a second MKB comprises logic for comparing the second verification data with the first verification data based upon an algorithm $Dv=AES\_128E$ (KM, O123456789ABCDEF16∥xxxxxxxxxxxxxxxx16), in which 0123456789ABCDEF 16 is a domain specific component of the verification record, xxxxxxxxxxxxxxxx16 is an 8-byte value and KM is a management key precursor associated with the first security class.

26. The computer programming product of claim 7, wherein the logic for authenticating a second MKB comprises logic for comparing the second verification data with the first verification data based upon an algorithm $Dv=AES\_128E$ (KM, O123456789ABCDEF16∥xxxxxxxxxxxxxxxx16), in which 0123456789ABCDEF 16 is a domain specific component of the verification record, xxxxxxxxxxxxxxxx16 is an 8-byte value and KM is a management key precursor associated with the first security class.

27. The method of claim 11, wherein the authenticating a second MKB comprises logic for comparing the second verification data with the first verification data based upon an algorithm $Dv=AES\_128E$ (KM, O123456789ABCDEF16∥xxxxxxxxxxxxxxxx16), in which 0123456789ABCDEF 16 is as domain specific component of the verification record, xxxxxxxxxxxxxxxx16 is an 8-byte value and KM is a management key precursor associated with the first security class.

28. The method of claim 19, wherein the authenticating a second MKB comprises logic for comparing the second verification data with the first verification data based upon an algorithm $Dv=AES\_128E$ (KM, O123456789ABCDEF16∥xxxxxxxxxxxxxxxx16), in which 0123456789ABCDEF 16 is a domain specific component of the verification record, xxxxxxxxxxxxxxxx16 is an 8-byte value and KM is a management key precursor associated with the first security class.

* * * * *